United States Patent [19]

Rawson, III et al.

[11] Patent Number: 5,675,795
[45] Date of Patent: Oct. 7, 1997

[54] BOOT ARCHITECTURE FOR MICROKERNEL-BASED SYSTEMS

[75] Inventors: Freeman L. Rawson, III, Boca Raton; Guy G. Sotomayor, Jr., West Palm Beach, both of Fla.

[73] Assignee: International Business Machines Corporation, Armonk, N.Y.

[21] Appl. No.: 494,742

[22] Filed: Jun. 26, 1995

Related U.S. Application Data

[63] Continuation of Ser. No. 54,117, Apr. 26, 1993, abandoned.

[51] Int. Cl.$^6$ .................................................. G06F 9/445
[52] U.S. Cl. .......................................................... 395/652
[58] Field of Search ...................................... 395/651, 652

[56] References Cited

U.S. PATENT DOCUMENTS

| | | | |
|---|---|---|---|
| 4,626,986 | 12/1986 | Mori | 395/652 X |
| 4,654,783 | 3/1987 | Veres et al. | 364/DIG. 1 |
| 5,297,282 | 3/1994 | Meilak et al. | 395/700 |
| 5,325,532 | 6/1994 | Crosswy et al. | 395/652 |
| 5,355,498 | 10/1994 | Provino et al. | 395/652 |
| 5,367,688 | 11/1994 | Croll | 395/652 |
| 5,497,492 | 3/1996 | Zbikowski et al. | 395/652 |

OTHER PUBLICATIONS

Forim, A., et al., "An I/O System for Mar. 3.0", Proc. of the Usenix Mach System, Nov. 20–22, ch1991, pp. 163–176.

Guillemont, M. et al. "Ad Second-Generation Micro-Kernel Based Unix; Lessons in Performance and Compatibility", Proc. of 1991 USENIX Conference, Jan. 21–25, 1991, pp. 13–22.

Bricker, A., et al., "Architecture issue in Micro kernel–based Operating systems: The chorus experence", Comp. Comm. V. 14, No. 6, 1991, pp. 347–357.

Usenix, March Symposium, Gerald Malan, et al. pp. 27–38 "DOS as a March 3.0 Application".

Usenix, March Symposium, Daniel P. Julin et al. pp. 13–26 "Generalized Emulation Services for March 3.0 Overview, Experiences and Current Status".

*Primary Examiner*—Thomas M. Heckler
*Attorney, Agent, or Firm*—Bruce J. Jobse; Duke W. Yee; Andrew J. Dillon

[57] ABSTRACT

A data processing system having an operating system environment, an operating system kernel, and a plurality of device drivers, wherein the plurality of device drivers are programs separate from the kernel. The data processing system includes a kernel that excludes device driver functions. The device drivers in the data processing system are user level tasks or programs. A boot volume stored in a storage device in the data processing system is provided, wherein the boot volume includes: (1) a file anchor, indicating a starting point to find files associated with the boot volume; (2) a plurality of file headers associated with the file anchor, each file header including an identification of files associated with the boot volume; and (3) a plurality of block list elements, each block list element identifying a contiguous block of data in a storage device, wherein data structures comprising a file may be identified and accessed using at least one block list element. A bootstrap task is used to load files into the memory from the data storage device using the boot volume to access the appropriate files, wherein the operating system environment may be initialized.

15 Claims, 8 Drawing Sheets

BOOT ARCHITECTURE FOR MICROKERNEL-BASED SYSTEMS

This is a continuation of application Ser. No. 08/054,117 filed Apr. 26, 1993, now abandoned.

BACKGROUND OF THE INVENTION

1. Technical Field

The present invention relates to an improved data processing system, and in particular to an improved method and system for initializing a data processing system. Still more specifically, the present invention provides a method and system for initializing a data processing system using a micro-kernel.

2. Description of the Related Art

The field of operating systems has become a highly contested area for open system standards in data processing systems. Support for multiple operating systems has become desirable as a result of the contest between various national, international, and industrial entities for a dominate operating system. One approach to creating operating systems is to separate the parts of the operating system that control basic hardware resources from those parts that determine the unique characteristics of an operating system environment to produce a "pure kernel". The specific parts associated with hardware resources are often called the "operating system kernel". This type of design can allow for more than one operating system environment to be implemented on the same data processing system. Also, more than one operating system environment may be simultaneously supported in native mode on the same data processing system.

Complex problems may occur in creating a "pure kernel" that has no dependencies on previously existing operating systems and which allow the pure kernel to support different operating system environments. For example, a operating system "pure kernel" must be neutral among a number of different operating system environments and use device drivers that run at a user level to provide a method for bootstrapping the operating system kernel or micro kernel and at least one operating system environment on top of it. Presently, the problem has been dealt with by creating bound images of the operating system kernel and the programs that are to be executed by the operating system kernel or by assuming the system includes a specific operating system environment that is loaded shortly after boot and contains a file system that may be used during the balance of the bootstrap process. Neither of these solutions has to operate in an environment in which the device drivers are separate from the tasks that are loaded during or after the bootstrap process.

Therefore it would be desirable to have a complete bootstrap architecture to deal with the entire sequence of events from the end of the hardware-defined ROM boot to the execution of the standard initialization sequence of the first operating system environment.

SUMMARY OF THE INVENTION

It is therefore one object of the present invention to provide an improved data processing system.

It is another object of the present invention to provide a method and system for initializing a data processing system using a micro-kernel.

It is yet another object of the present invention to provide a method and system for initializing a data processing system.

The foregoing objects are achieved as is now described. The present invention relates to a data processing system having an operating system environment, an operating system kernel, and a plurality of device drivers, wherein the plurality of device drivers are programs separate from the kernel. The data processing system includes a kernel that excludes device driver functions. The device drivers in the data processing system are user level tasks or programs. A boot volume stored in a storage device in the data processing system is provided, wherein the boot volume includes: (1) a file anchor, indicating a starting point to find files associated with the boot volume; (2) a plurality of file headers associated with the file anchor, each file header including an identification of files associated with the boot volume; and (3) a plurality of block list elements, each block list element identifying a contiguous block of data in a storage device, wherein data structures comprising a file may be identified and accessed using at least one block list element. A bootstrap task is used to load files into the memory from the data storage device using the boot volume to access the appropriate files, wherein the operating system environment may be initialized.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
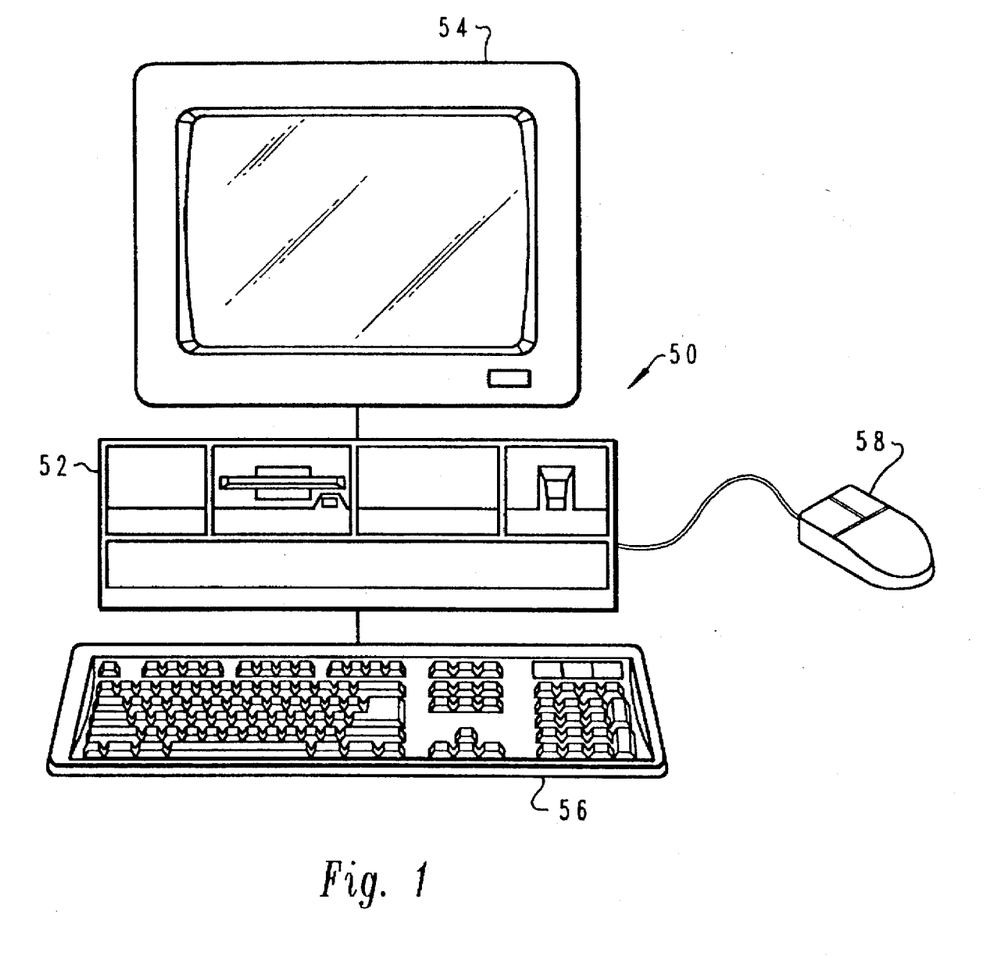
FIG. 1 is a pictorial representation of a data processing system that may be utilized to implement a method and system of the present invention.

With reference now to the figures and in particular with reference to FIG. 1, there is depicted a pictorial representation of a data processing system in which the present invention may be implemented in accordance with a preferred embodiment of the present invention. A computer 50 is depicted which includes a system unit 52, a video display terminal 54, a keyboard 56, and a mouse 58. Computer 50 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and PS/2 is a registered trademark of International Business Machines Corporation.

Figure 2:
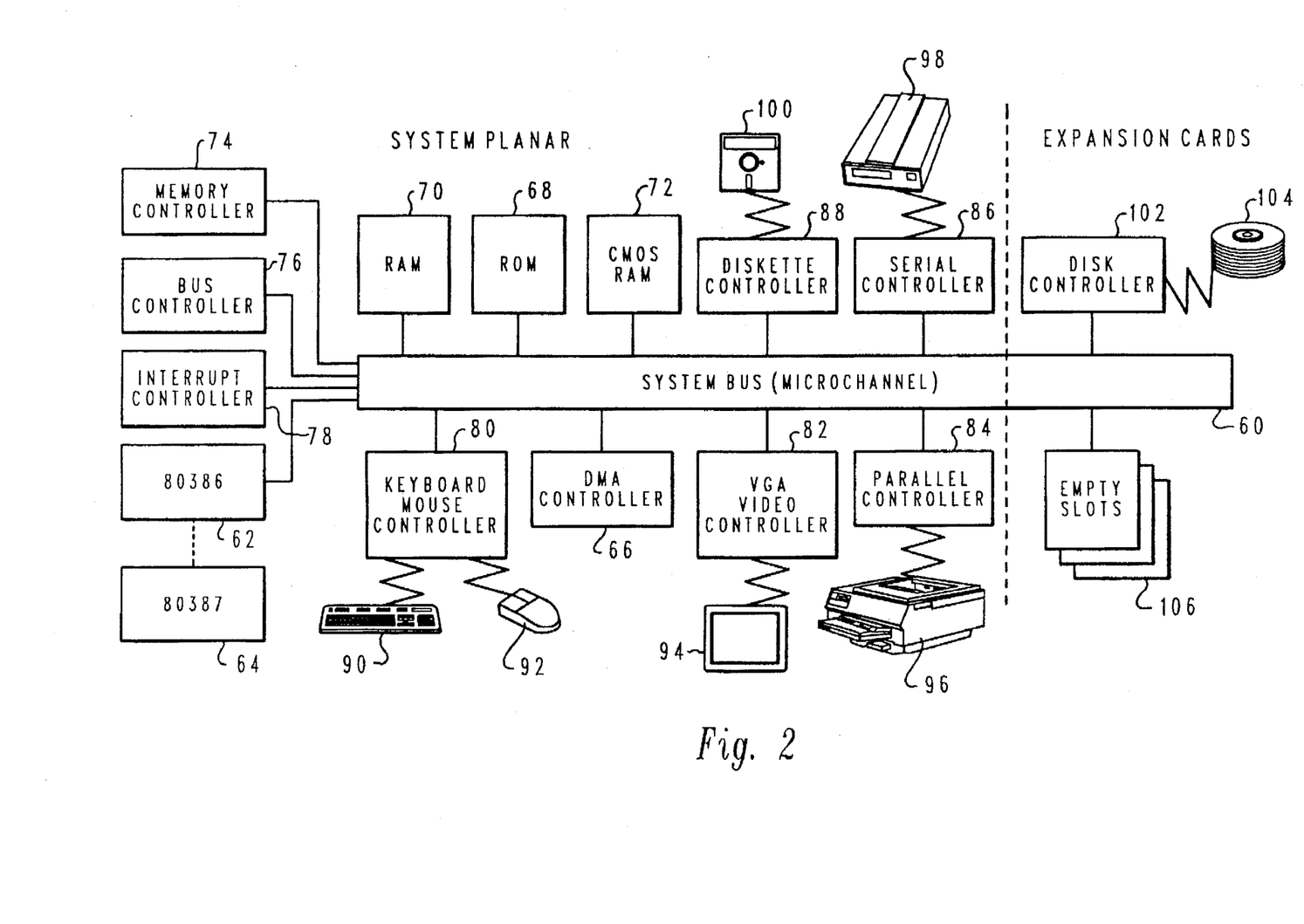
FIG. 2 depicts a block diagram of selected components in the data processing system illustrated in FIG. 1 in which a preferred embodiment of the present invention may be implemented.

Referring now to FIG. 2, there is depicted a block diagram of selected components in personal computer 50 in which a preferred embodiment of the present invention may be implemented. System unit 52 preferably includes a system bus 60 for interconnecting and establishing communication between various components in system unit 52. Microprocessor 62 is connected to system bus 60 and also may have numeric coprocessor 64 connected to it. System bus 60 may be a Micro Channel system bus from International Business Machines Corporation. "Micro Channel" is a registered trademark of International Business Machines Corporation. Direct memory access (DMA) controller 66 is also connected to system bus 60 and allows various devices to appropriate cycles from microprocessor 62 during large I/O transfers.

Read Only Memory (ROM) 68 and Random Access Memory (RAM) 70 are also connected to system bus 60. ROM 68 contains the power-on self test (POST). CMOS RAM 72 may be attached to system bus 60 and may contain system configuration information.

Also connected to system bus 60 are memory controller 74, bus controller 76, and interrupt controller 78 which serve to aid in the control of data flow through system bus 60 between various peripherals, adapters, and devices. System unit 52 also contains various input/output (I/O) controllers such as: keyboard and mouse controller 80, video controller 82, parallel controller 84, serial controller 86, and diskette controller 88. Keyboard and mouse controller 80 provide a hardware interface for keyboard 90 and mouse 92. Video controller 82 provides a hardware interface for video display terminal 94. Parallel controller 84 provides a hardware interface for devices such as printer 96. Serial controller 86 provides a hardware interface for devices such as a modem 98. Diskette controller 88 provides a hardware interface for floppy disk unit 100. Expansion cards also may be added to system bus 60, such as disk controller 102, which provides a hardware interface for hard disk unit 104. Empty slots 106 are provided so that other peripherals, adapters, and devices may be added to system unit 52.

Those skilled in the art will appreciate that the hardware depicted in FIG. 2 may vary for specific applications. For example, other peripheral devices such as: optical disk media, audio adapters, or chip programming devices such as a PAL or EPROM programming device, and the like also may be utilized in addition to or in place of the hardware already depicted.

Figure 3:
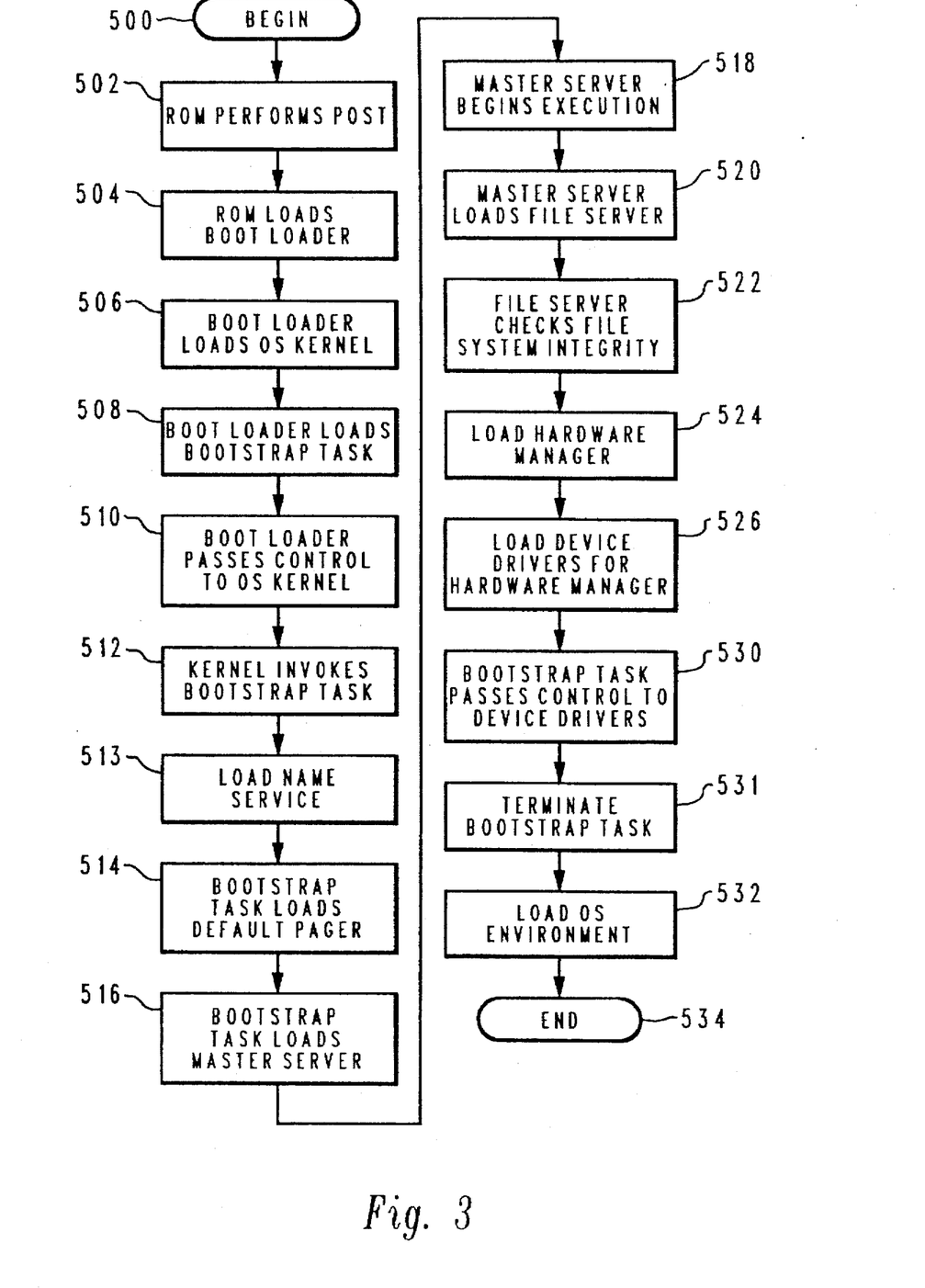
FIG. 3 depicts a flowchart of a method for booting a data processing system in accordance with a preferred embodiment of the present invention.

Referring now to FIG. 3, a flowchart of a method for booting a data processing system is illustrated in accordance with a preferred embodiment of the present invention. More detailed descriptions of some of the components, such as the Boot Volume, Bootstrap Task OS Kernel, and Master Server may be found in the discussions of FIGS. 4-11. The process begins, as depicted, in block 500 and thereafter proceeds to block 502. Block 502 illustrates the ROM performing a POST. Thereafter, the proceeds to block 504. Block 504 depicts the ROM loading the Boot Loader. The process then advances to block 506, which illustrates the Boot Loader loading the operating system (OS) Kernel. Next, the process proceeds to block 508, which depicts the Boot Loader loading the Bootstrap Task.

Afterward, the Boot Loader passes control to the OS kernel in block 510. Block 512 illustrates the OS Kernel invoking the Bootstrap Task. The Name Service is loaded in block 513. The process then advances to block 514, which depicts the Bootstrap Task loading the Default Pager. Next, block 516 illustrates the Bootstrap Task loading the Master Server. The process then advances to block 518, which depicts the Master Server beginning execution. Next, the process proceeds to block 520. Block 520 illustrates the Master Server loading a File Server. The process then advances to block 522, which illustrates the File Server checking the file system integrity. The process then proceeds to block 524, which depicts the loading of the Hardware Resource Manager. The process then proceeds to block 526. Block 526 illustrates the loading of device drivers for the Hardware Resource Manager.

Next, the process proceeds to block 530. Block 530 illustrates the passing of the device control for the boot device from the Bootstrap Task to the device drivers loaded in block 526. The Bootstrap Task is terminated in block 531. Thereafter, the process passes to block 532, which depicts the loading and initiation of the operating system environment. The process thereafter terminates, as illustrated, in block 534.

In the boot process, a number of different boot components are used to initiate an operating system in a data processing system. These various components include: a Boot Volume, a Boot Loader, a Operating System (OS) Kernel, a Bootstrap Task, a Name Service, a Default Pager, an Initial Page Space, a Master Server, a File System Server, a Hardware Resource Manager, and a Boot Device Driver operating system environment. The Boot Volume contains a description of what files or programs are to be loaded as part of the boot process. The Boot Volume is comprised of a number of sequential sectors on a disk. Typically, the Boot Volume contains descriptions of the files that are to be loaded, omitting the files themselves in accordance with a preferred embodiment of the present invention. Excluding files from the Boot Volume makes the Boot Volume significantly smaller than if the contents of the files themselves were also contained within the Boot Volume. Additionally, the content of the Boot Volume may be easily changed using standard programming utilities executing in one of the operating system environments. Consequently, since less space is required to contain the information, extra space may be allocated for the Boot Volume in the case where the contents of the Boot Volume needs to be changed and the amount of space required is greater than what was needed for the previous contents of the Boot Volume.

Many modern file systems are log-based, logging changes to guard against data loss in the face of system failure. Data stored in such file systems are not accessible using the file systems's data structures until such structures are corrected at file system initialization by a utility that accesses and applies the log. The boot volume provides an alternate set of data structures sufficient to execute the file system and the correction utility and thus permit the correct resumption of file system operation.

For some systems, the Boot Volume will include all of the files described within the Boot Volume. The implementation depends on how the specific hardware operates at boot time. For example, the RS/6000 cannot perform any I/O until the hardware is configured.

For some systems on which the files described by the Boot Volume are not contained therein, the invention permits utility and operating system environment programs that read these files as part of their normal operation to read the true copies of said files rather than potentially incorrect duplicates.

Figure 4:
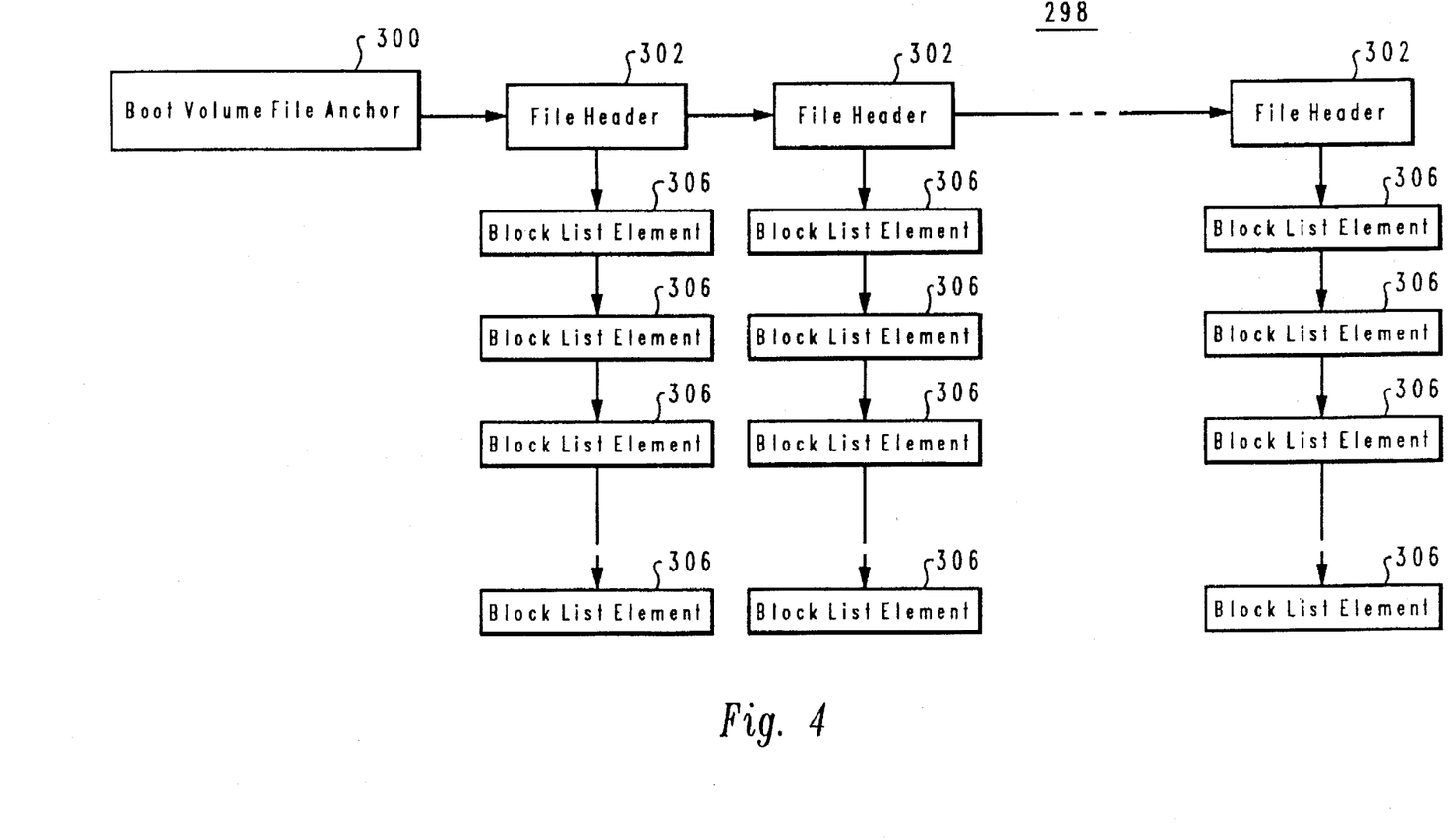
FIG. 4 is a digram of a boot volume structure in accordance with a preferred embodiment of the present invention.

Referring now to FIG. 4, a diagram of a Boot Volume structure is depicted in accordance with a preferred embodiment of the present invention. Boot Volume 298 includes a number of data structures, also called "records": a Boot Volume File Anchor 300, file headers 302, and block list elements 306. The Boot Volume design and layout is designed to be file system independent with the actual file stored in the file system.

Although arrow pointers are illustrated in FIG. 4, the contents of the Boot Volume are typically created all at once with the individual data structures being stored more as arrays than as linked lists. All offsets contained in the Boot Volume are byte offsets that are relative to the start of the Boot Volume and all multi-byte values that are stored on a disk are stored as the natural endian of the system interpreting the data in accordance with a preferred embodiment of the present invention.

Figure 5:
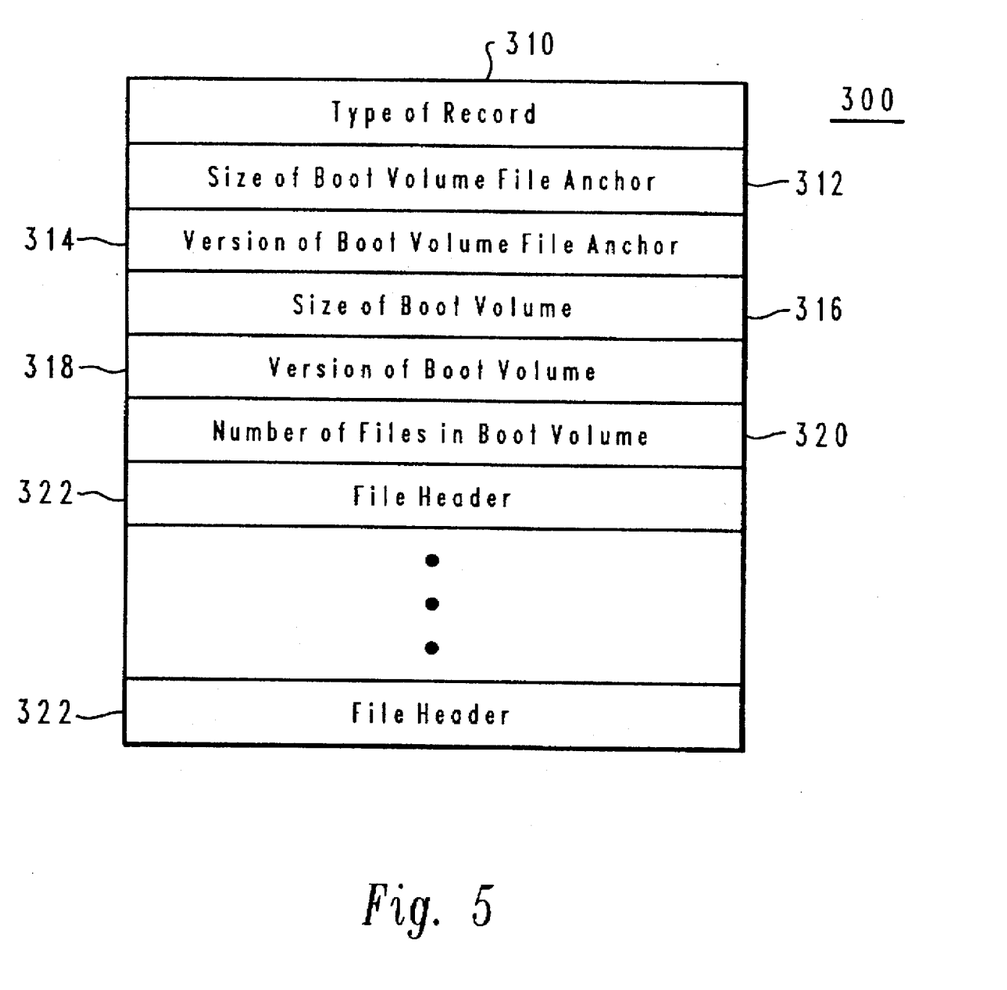
FIG. 5 depicts a diagram of a boot volume file anchor in accordance with a preferred embodiment of the present invention.

Referring now to FIG. 5, a diagram of Boot Volume File Anchor 300 is depicted. Boot Volume File Anchor 300 is a record that is the anchor for the contents of Boot Volume 298. This anchor serves as the starting point to find files described by Boot Volume 298. Boot Volume file anchor 300 includes field 310, which describes the type of record. Field 310 identifies the record as a Boot Volume File Anchor. Also included is field 312, the size of Boot Volume File Anchor. This field indicates the number of bytes occupied by Boot Volume File Anchor 300. Next in Boot Volume File Anchor 300 is field 314, the version of boot file anchor, which indicates the current version number of the structure. This is a field used to indicate slight variations of the internal structure or meanings of fields in the Boot Volume file anchor 300.

Field 316 is the size of the Boot Volume and indicates the number of bytes occupied by the Boot Volume. The number of bytes includes the Boot Volume file anchor. Field 318 is the version of Boot Volume, which is a field indicating the current version number of the Boot Volume. This field is used to indicate slight variations of the internal structure or meanings of the fields in the Boot Volume. Field 320 indicates the number of file headers that are contained in the Boot Volume file anchor. Fields 322 each describe a file referenced by the Boot Volume and is described in more detail below.

Figure 6:
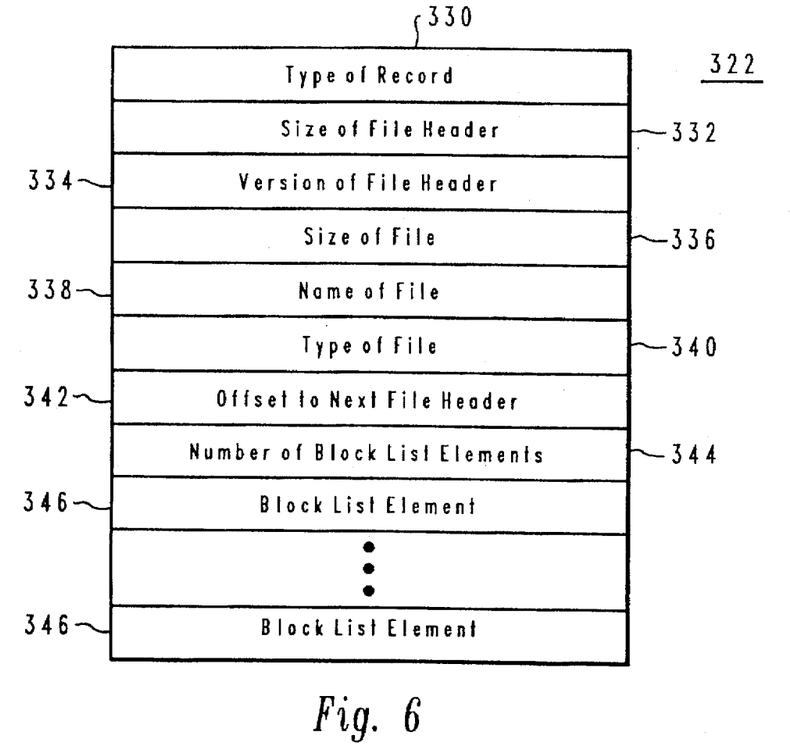
FIG. 6 is a diagram of a file header in accordance with a preferred embodiment of the present invention.

Referring now to FIG. 6, a diagram of a file header 322 is illustrated in accordance with a preferred embodiment of the present invention. The file header is a data structure used in the Boot Volume to describe an individual file that is to be referenced during the boot process before a real file system has been loaded into the data processing system. File header 322 includes field 330, which indicates the format of the record, identifying the record as file header 322. Field 332 is the size of the file header field, which indicates the number of bytes occupied by the file header. The count for this field starts at the first field and ends after the last block list element.

Next, field 334 is the version of the file header and indicates the current version number of the file header structure. This field is used to indicate slight variations in the internal structure or meaning of fields in file header 322. Field 336 is the size of the file; indicating the total number of bytes occupied by the file. Field 338 is the name of the file. This field indicates the name of the file and is a null terminated string. Typically, field 338 is the name of the file contained in the actual user file system. The size of this field is typically 256 characters. Field 340 indicates the type of file that is described by file header 322. Various file types may be described by field 340. Some of the file types that may be described include:

(1) OS Kernel - a flag indicating that the file is a OS kernel. This allows the Boot Loader program to scan for a file with this attribute set and not be hard coded with the name of the OS kernel.

(2) Bootstrap Task - a flag indicating that the file is a Bootstrap Task, allowing the Boot Loader program to scan for a file with this attribute set and not to be hard coded with the name of Bootstrap Task.

(3) Name Service - a flag indicating that the file is a name server, allowing the Bootstrap Task to scan for a file with this attribute set and not be hard coded with the name of the Name Service program.

(4) Pager - a flag indicating that the file is the default pager (i.e., the pager for anonymous memory), allowing the Bootstrap Task to scan for a file with this attribute set and not to be hard coded with the name of the pager program.

(5) Paging File - a flag indicating that the file is to be used by the default pager for paging. This flag allows the Bootstrap Task to scan for a file with this attribute set and not to be hard coded with the name of the Paging File.

(6) Master Server - a flag indicating that the file is the Master Server. The Master Server is a program that is responsible for loading other servers. This flag allows the Bootstrap Task to scan for a file with this attribute set and not to be hard coded with the name of the Master Server.

(7) Master Server Config File - a flag indicating that the file contains the configuration information that the Master Server needs in order to configure the system and what other servers to bring up as a part of the boot process. This flag allows the Bootstrap Task to find the file and pass it to the Master Server when the Master Server begins executing.

(8) Executable File - a flag indicating that the file is a general executable file. The Master Server will use this flag to determine if the file is a server that should be loaded.

(9) Data File - a flag indicating that the file contains non-executable data.

Field 342 is the offset to the next file header. This field contains the offset from the beginning of the Boot Volume of the next file header contained in the Boot Volume. If this file header is the last one in the Boot Volume, this field will contain the value zero in accordance with a preferred embodiment of the present invention. Field 344 is the number of block list elements; this field contains the number of block list elements that are needed to represent the file. Field 346 is a block list element, which is a structure that describes a number of physically contiguous blocks on the disk. This structure is described in more detail below.

Figure 7:
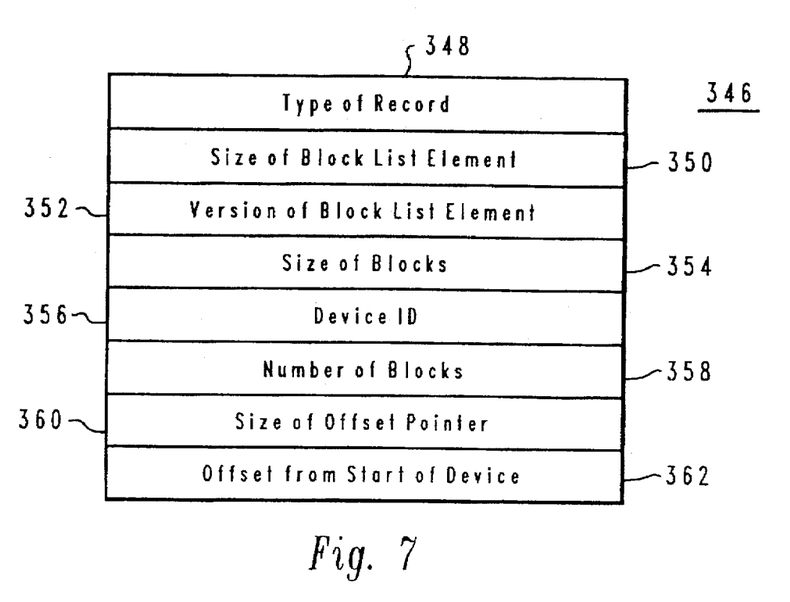
FIG. 7 depicts a block diagram of a block list element in accordance with a preferred embodiment of the present invention.

Referring now to FIG. 7, a block diagram of a block list element 346 is depicted. Block list element 346 is a data structure used to describe a set of physically contiguous blocks on a hard drive. Block list element 346 includes field 348, the type of record, which indicates the format of the record. This field identifies the record as a block list element in block list element 346. Field 350 is the size of a block list element, indicating the number of bytes occupied by block list element 346. The number of bytes is counted from the first field. Field 352 is the version of the block list element; this field indicates the current version number of the data structure and is used to indicate slight variations in the internal structure or meanings of fields in block list element 346. Field 354 is the size of blocks, indicating the number of bytes that are contained in a block on the device.

The device ID is indicated by field 356. This field indicates the device on which the device resides. The device ID is typically a null terminated string in accordance with a preferred embodiment of the present invention. Field 358 indicates the number of blocks physically contiguous on the device that block list element 346 represents. Field 360 is the size of the offset pointer. This field indicates the number of bits that are contained in the offset from the start of device field. In accordance with a preferred embodiment of the present invention, the number of bytes used to store the offset will always be a multiple of four, however, not all of the bits in the offset field may have significance. Field 362 is the offset from the start of device. This field contains the byte offset from the start of the device of the first block described by this record. The size of this field is defined by field 358.

The Boot Loader is a program loaded by some hardware or system specified mechanisms, such as a ROM. The Boot Loader is responsible for interpreting the format of the Boot Volume and loading the OS kernel and the Bootstrap Task into system memory. The Boot Loader also initiates the execution of the OS Kernel. In addition to loading the OS kernel and Bootstrap Task into memory, the Boot Loader will pass information to the OS kernel before transferring control to the OS kernel.

Figure 8:
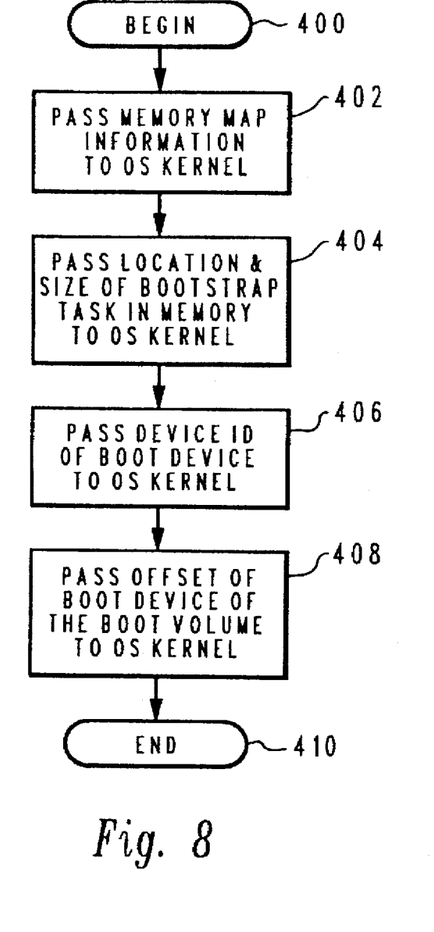
FIG. 8 is a high level flowchart of a method for sending information to the OS Kernel in accordance with a preferred embodiment of the present invention.

Referring now to FIG. 8, a high level flowchart of a method for sending information to the OS Kernel is illustrated. As depicted, the process begins in block 400 and thereafter proceeds to block 402, which illustrates the passing of the memory map information to the OS Kernel. The memory map information describes the layout of the physical memory to the OS Kernel. If all of the physical memory is not contiguous, then the memory map will reflect the various physical memory regions. The memory map also may include attribute information for regions having attributes of interest to the OS Kernel.

The process then proceeds to block 404, which depicts the passing of the location and size of the Bootstrap Task in memory to the OS kernel. This information describes the physical address of the Bootstrap Task in memory and its size. The information passed to the OS kernel also may include the offset into the Bootstrap Task where execution begins. Additionally, if the Bootstrap Task is divided into several regions (i.e., text and data), then information describing each region also will be sent to the OS Kernel. Next, the process proceeds to block 406, which illustrates the passing of the device ID of the boot device to the OS kernel. The device ID of the boot device identifies the device containing the Boot Volume from which the Boot Loader loaded the OS Kernel and the Bootstrap Task. This information is provided to the OS Kernel so that it may be passed on to the Bootstrap Task.

Afterward, the process proceeds to block 408, which depicts the passing of the offset of the boot device of the Boot Volume to the OS Kernel. The offset provides the location of the Boot Volume on the boot device. This information allows for multiple Boot Volumes on the boot device and allows the other components of the boot process to execute without having to know the exact layout of the boot device. The information is provided to the OS Kernel to be passed on to the Bootstrap Task. Afterward, the process terminates in block 410 as illustrated.

Information may be passed between various programs in the memory by a number of different methods known to those skilled in the art. For example, information may be passed by placing the parameters on a stack or by providing a pointer to the information in memory to the program that information is being passed to.

In accordance with a preferred embodiment of the present invention information may be provided to the OS Kernel as an array of character strings separated by new-line characters (i.e.,\n). The entire array will be terminated by a null character. The format of the array is shown as follows:

```
variable1 = value 1\n
variable2 = value 2\n
...
variablen = valuen\n\0
```

The values of the variables may have the following types:

| Value Type | Syntax | Example |
|---|---|---|
| INTTYPE | int | VAR = −1 or VAR = 1 |
| UINTTYPE | uint | VAR = 1 |
| CHARTYPE | char | VAR = c |
| STRINGTYPE | "..." | VAR = "abcdefg" |
| MULTIRANGETYPE | int1 ... int2 | VAR = 1 ... 4 |
| | int1,int2 | VAR = 1,3 |
| | | VAR = 1 ... 4,8 ... 10,12,17 |

The actual parameters that may be passed to the OS kernel are shown as follows:

```
MEMORYMAP=x1..y1, x2..y2, x3..y3
    This describes the system memory map. There can be multiple
    ranges because in many systems there are "holes" in the
    physical address space where memory is located. There are
    only as many ranges as necessary to fully describe the memory
    that is present in the system. The values supplied are integers.
    The base is assumed to be decimal. If the value starts with
    "0x", the value will be considered to be hexadecimal.
BOOTTASK_NUM_REGION=n
    This indicates the number of regions that have been provided
    to the kernel to describe the Bootstrap Task. The value is an
    integer.
BOOTTASK_REGION=x..y, vs, "..."
    This describes an individual region of the Bootstrap Task's
    address space. The values that are passed are described
    below.
    x..y This describes the physical region in memory. The
        values are integers. The base is assumed to be
        decimal. If the value starts with "0x", the value
        will be considered to be hexadecimal.
    vs This describes the virtual start address of the
        region. This is the address in the Bootstrap
        Task's address space where the start of the
        region should appear. The value is an integer.
        The base is assumed to be decimal. If the value
        starts with "0x", the value will be considered to be
        hexadecimal.
    "..." This describes the protection flags that should be
        applied to the region. This is a string. The
        contents of the string are the symbolic names of
        the flags separated by a "|" character. The
        symbolic names are:
        VM_PROT_READ Allows read access
```

```
        VM_PROT_WRITE Allows write access
        VM_PROT_EXECUTE Allows execute access
    BOOTTASK_STATE=n1, n2, ...nm
        This describes the execution state that is to be set when the
        kernel starts executing the Bootstrap Task. The parameters
        correspond to the processor dependent information that is
        required to establish a correct execution state.
    KERNEL_PATCH=x..y, value
        This allows certain kernel data to be changed during the
        initialization of the kernel. This could allow for example certain
        debug options to be turned on in the kernel. The values are
        described below.
        x..y This describes the range of kernel virtual
            addresses that are to be changed. The range
            assumes bytes, so multi-byte values must be
            specified as a range. The interpretation of what
            the range represents is indicated by the type of
            the value.
        value This is the value that is to be placed into the range
            of kernel addresses. The value specified does
            not have to be restricted to a single value but can
            be a list of values. The only requirement is that
            all of the values must be of the same type.
    BOOTVOL_DEVICE="..."
        This describes the device on which the Boot Volume is located.
        It is a string that contains the name of the device.
    BOOTVOL_OFFSET=n
        This describes the location of the Boot volume from the start of
        the Boot Device. The value supplied is an integer. The base
        is assumed to be decimal. If the value starts with "0x", the
        value will be considered to be hexadecimal.
```

The Bootstrap Task is responsible for three major functions in accordance with a preferred embodiment of the present invention: (1) loading the initial tasks into the system prior to and including the Master Server; (2) acting as a primitive device driver set until the correct system level functions are loaded; and (3) to act as a file system server for the Boot Volume so that other tasks that need to access the Boot Volume do not have to interpret the contents of the Boot Volume themselves.

Figure 9:
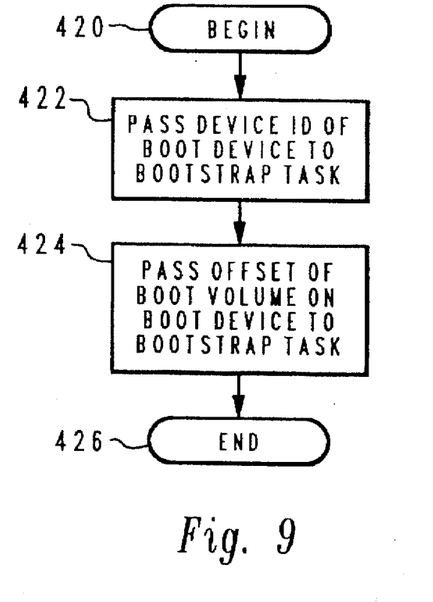
FIG. 9 depicts a high level flowchart of a method for passing information to the Bootstrap Task from the OS Kernel in accordance with a preferred embodiment of the present invention.

Information also is passed to the Bootstrap Task from the OS Kernel. This can be done in two ways. The first is to have the information passed as parameters (i.e., they are on the stack when the Bootstrap Task is started). The second is to have the information placed in the OS Kernel's boot parameter list which the Bootstrap Task can retrieve. FIG. 9, is a high level flowchart of a method and system for passing information to the Bootstrap Task from the OS Kernel in accordance with a preferred embodiment of the present invention. As illustrated, the process begins in block 420 and thereafter proceeds to block 422, which illustrates passing the device ID of the boot device as a parameter to the Bootstrap Task. The device ID of the boot device identifies the device from which the OS kernel and the Bootstrap Task were loaded.

Thereafter, the process proceeds to block 424, which depicts the passing of the Boot Volume on the boot device to the Bootstrap Task. The offset of the Boot Volume identifies the location of the Boot Volume on the boot device. This information allows the Bootstrap Task to contain only knowledge of the format of the Boot Volume. This information allows the Bootstrap Task to ignore the overall structure of the content of the boot device. Afterward, the process terminates as depicted in block 426.

Figure 10:
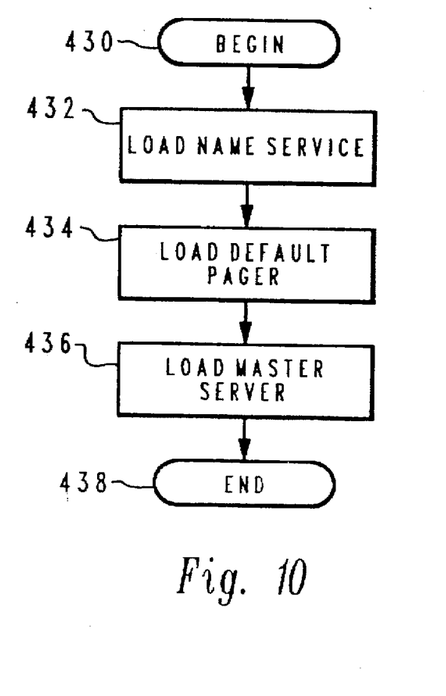
FIG. 10 is a high level flowchart of a method for loading programs by the Bootstrap Task.

The Bootstrap Task also loads three other programs, as illustrated in FIG. 10. The process begins in block 430 and thereafter proceeds to block 432. Block 432 depicts the loading of the system Name Service. Thereafter the process advances to block 434, which illustrates the loading of the Default Pager into the memory. The process then proceeds to block 436. Block 436 depicts the loading of the Master Server into memory. Thereafter, the process terminates in block 438.

The system Name Service program is the first program to be loaded into memory by the Bootstrap Task. The Name Service is loaded first to provide connections between other servers in accordance with a preferred embodiment of the present invention. By starting the Name Service as soon as possible, it can be used by all the servers that are started after it. Additionally, the need for an interim Name Service is eliminated.

Typically, the Default Pager is loaded as early as possible in the boot sequence to allow memory to be over-committed. The Default Pager allows paging to areas on the boot device that are described by an initial paging space passed to the Default Pager by the Bootstrap Task. As a result, the operating system may be brought up on data processing systems with relatively small amounts of main memory. The Master Server is brought into memory next and allows for the loading functions of the Bootstrap Task to be dispensed with. The Master Server is responsible for the overall operation of a system once it has been loaded by the Bootstrap Task.

Once the Master Server has been started, the Bootstrap Task becomes a set of very primitive device drivers. These device drivers will be responsible for handling I/O to the boot device for paging services and program loading. Additionally, the Bootstrap Task at this point may provide minimal console support to the Master Server to communicate with a user. As soon as the appropriate system functions are running, the Bootstrap Task will be terminated and will relinquish any resources that it possesses. The Bootstrap Task supports a set of messages, which will allow the Master Server, among others, to request the performance of certain operations by the Bootstrap Task.

As a result, the use of a Bootstrap Task in accordance with a preferred embodiment of the present invention provides a simple file system using the Boot Volume so that the Bootstrap Task can gain access to the files contained in the Boot Volume. Additionally, the Bootstrap Task provides a program loader to allow for some initial programs to be loaded. As a part of loading a program, the Bootstrap Task will allow the program access to the Name Service once the Name Service has been started. Additionally, the Bootstrap Task provides a simple set of device drivers to allow other servers to read and write data onto the boot devices described by the Boot Volume. The Bootstrap Task also provides a simple device driver to allow servers to communicate with an operator or user if necessary during the boot Finally, the Bootstrap Task also provides a set of file system interfaces to allow other programs to access the contents of the Boot Volume. As a result, the Bootstrap Task acts as a file system for the Boot Volume until the actual file system for the data processing system can be loaded and initiated.

Figure 11:
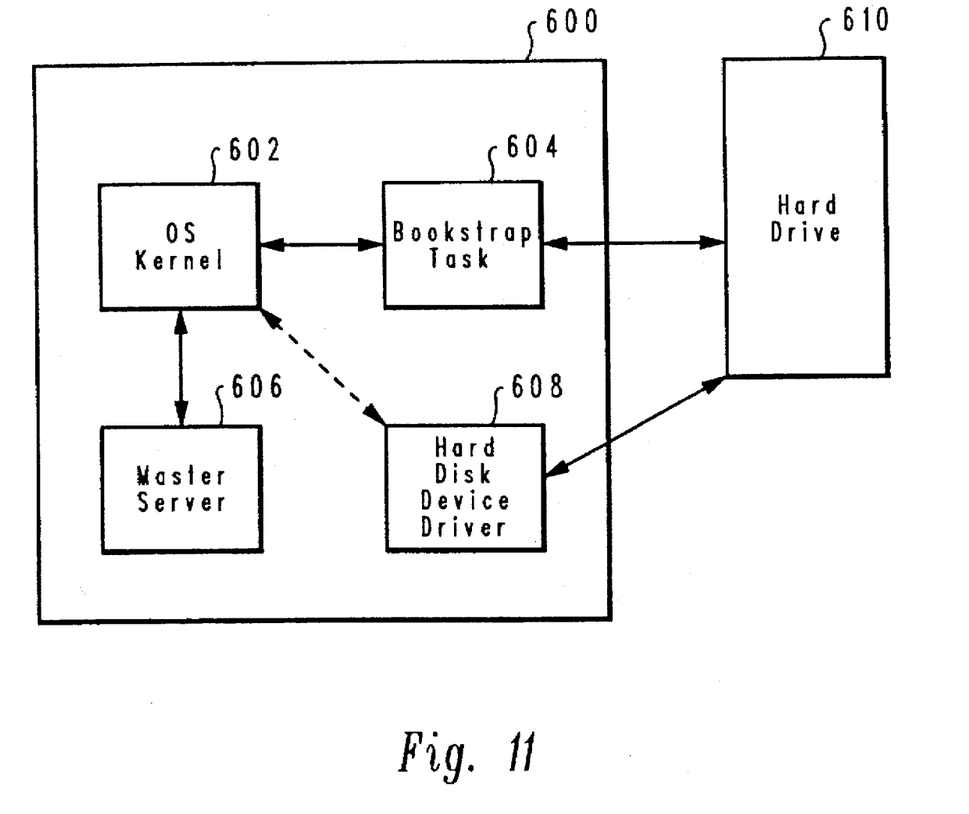
FIG. 11 depicts a block diagram of selected components used in booting a data processing system in accordance with a preferred embodiment of the present invention.

Referring now to FIG. 11, a block diagram of selected components used in booting a data processing system is illustrated. Memory 600 includes OS Kernel 602, Bootstrap Task 604, Master Server 606, and hard disk device driver 608. OS kernel 602 and Bootstrap Task 604 are loaded by the Boot Loader during the boot process. Bootstrap Task loads Master Server 606 as part of the boot process. Initially, files are loaded by Bootstrap Task from hard drive 610 using information from the Boot Volume. Housekeeping functions and other tasks requiring files from the hard drive may be accessed by sending messages to OS kernel 602, which initially relays the messages to Bootstrap Task 604 until enough system functions have been loaded into memory 600. The loading of hard disk device driver 608 among other selected functions into memory 600 allows Master Server 606 to access hard drive 610 without the need for Bootstrap Task 604 and the Boot Volume. At that point, Bootstrap Task 604 is terminated and requests requiring accessing of files in hard drive 610 are routed to hard disk device driver 608 by OS kernel 602. Other functions handled by Bootstrap Task 604 also are routed to other programs or device drivers (not shown) in memory 600. Although the depicted embodiment shows a hard disk, a preferred embodiment of the present invention may be implemented using any type of media used to boot or initialize a data processing system.

Although the depicted embodiment is shown on a single computer, the present invention also may be implemented on a network, distributed or multi-processor data processing system. A preferred embodiment of the present invention may be implemented in a data processing system using a Mach derivative micro-kernel, having user level device drivers. More information on Mach derivative micro-kernels may be found in Richard Rashid et al., Mach: A Foundation For Operating Systems, Proceedings of the Second Work Shop on Work Station Operating Systems, pp. 109–113, IEEE Computer Society, September, 1989.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for initiating operation of an operating system environment in the data processing system, wherein the data processing system has a kernel and a plurality of device drivers and wherein the plurality of device drivers are programs separate from the kernel, the method comprising the data processing system implemented steps of:

placing a boot volume in a memory, wherein the boot volume includes:
a file anchor, indicating a starting point to find files associated with the boot volume;
a plurality of file headers associated with the file anchor, each file header including an identification of files associated with the boot volume; and
a plurality of block list elements, each block list element identifying a contiguous block of data in a storage device, wherein data structures comprising a file may be identified and accessed using at least one block list element; and loading a plurality of programs associated with initialization of an operating system environment into the memory using the boot volume, whereby initialization of the operating system environment may be accomplished.

2. The method of claim 1, wherein the loading step includes loading device drivers.

3. The method of claim 2, further including loading a master server.

4. The method of claim 3, further including loading a file server and a file system.

5. The method of claim 4, wherein the file system includes a log and a plurality of files and further including using the log to determine if any correction of the file system is required prior to using the file system.

6. The method of claim 5, further including loading a operating system environment after a number of device drivers has been loaded.

7. A data processing system having an operating system environment, an operating system kernel, and a plurality of device drivers, wherein the plurality of device drivers are programs separate from the kernel, the data processing system comprising:

a kernel, excluding device driver functions;
a boot volume stored in a storage device, wherein the boot volume includes:
a file anchor, indicating a starting point to find files associated with the boot volume; a plurality of file headers associated with the file anchor, each file header including an identification of files associated with the boot volume; and a plurality of block list elements, each block list element identifying a contiguous block of data in a storage device, wherein data structures comprising a file may be identified as accessed using at least one block list element;
a boot strap task, wherein the bootstrap task uses the boot volume to load files specified by the boot volume into a memory from the storage device, wherein the operating system environment may be initialized.

8. A data processing system having an operating system environment, an operating system kernel, and a plurality of device drivers, wherein the plurality of device drivers are programs separate from the kernel, the data processing system comprising:

means for placing a boot volume in a memory, wherein the boot volume includes parameters identifying a plurality of files and locations of data structures comprising the plurality of files on a storage device; and means for loading a plurality of files associated with initialization of an operating system environment into the memory using the boot volume, whereby initialization of the operating system environment may be accomplished, wherein the parameters include:
a file anchor, indicating a starting point to find files associated with the boot volume
a plurality of file headers associated with the file anchor, each file header including an identification of files associated with the boot volume; and
a plurality of block list elements, each block list element identifying a contiguous block of data in a storage device, wherein data structures comprising a file may be identified and accessed using at least one block list element.

9. A data processing system comprising:

a boot volume located in the memory, wherein the boot volume includes:
a file anchor, indicating a starting point to find files associated with the boot volume;
a plurality of file headers associated with the file anchor, each file header including an identification of files associated with the boot volume; and
a plurality of block list elements, each block list element identifying a contiguous block of data in a storage device, wherein data structures comprising a file may be identified in access using at least one block list element; and loading means for loading a plurality of files associated with initialization of an operating system into the memory using the boot volume, wherein the boot volume design and layout is independent of the file system for the operating system environment to be loaded.

10. The data processing system of claim 9, wherein one of the at least one files indicated by the boot volume is the operating system kernel for the operating system to be loaded into memory, wherein the name of the operating system kernel is not hard coded in the boot volume.

11. The data processing system of claim 10, wherein the boot volume identifies an operating system kernel and the loading means loads the operating system kernel and further comprising transfer means for passing memory map information to the operating system kernel, wherein the memory map information describes a layout of a physical memory.

12. The method of claim 11, wherein a boot strap task is identified for loading by the boot volume and wherein the loading means loads the boot strap task into the memory and further comprising means for passing data from the boot strap task to the operating system kernel.

13. The data processing system of claim 12, wherein the boot strap task loads initial tasks into the data processing system prior to loading the master server.

14. The data processing system of claim 13, wherein the boot strap task acts as a primitive device driver set until the correct operating system level functions are loaded into memory.

15. The data processing system of claim 14, wherein the boot strap task acts as a file system server for the boot volume such that a requirement to interpret the content of the boot volume by other tasks needing access to the boot volume is absent.

* * * * *